United States Patent [19]

Higgins

[11] 4,356,014
[45] Oct. 26, 1982

[54] CRYOGENIC RECOVERY OF LIQUIDS FROM REFINERY OFF-GASES

[75] Inventor: Robert D. Higgins, Houston, Tex.

[73] Assignee: Petrochem Consultants, Inc., Houston, Tex.

[21] Appl. No.: 255,339

[22] Filed: Apr. 17, 1981

Related U.S. Application Data

[62] Division of Ser. No. 26,809, Apr. 4, 1979, Pat. No. 4,272,270.

[51] Int. Cl.$^3$ ............................................. F25J 3/02
[52] U.S. Cl. ........................................ 62/28; 62/24; 62/20; 62/39
[58] Field of Search ................. 62/20, 24, 27, 28, 38, 62/39

[56] References Cited

U.S. PATENT DOCUMENTS

| | | | |
|---|---|---|---|
| 3,242,682 | 3/1966 | English | 62/28 |
| 4,061,481 | 12/1977 | Campbell et al. | 62/28 |
| 4,155,729 | 5/1979 | Gray | 62/28 |
| 4,158,556 | 6/1979 | Yearout | 62/28 |

Primary Examiner—Norman Yudkoff
Attorney, Agent, or Firm—Pennie and Edmonds

[57] ABSTRACT

A vapor fraction containing hydrogen and at least one hydrocarbon selected from the group consisting of $C_1$ to $C_4$ hydrocarbons is separated from a hydrogen-rich refinery off-gas feed to give a liquid product fraction. The refinery off-gas is fed to and compressed in a compressor/expander having compressor means and expander means mounted and driven on a common shaft, and then cooled and partially condensed to form a two-phase fluid in a heat exchanger followed by separation of the vapor and liquid product phases of the fluid in a separator or a separator/fractionation column stabilizer unit. The separated vapor phase is transmitted to the compressor/expander unit wherein the vapor is depressurized and partially condensed, thereby driving the compressor. The partially condensed depressurized vapor fraction from the expander and, optionally, the liquid phase product fraction from the separator are transmitted in separate streams to the heat exchanger for separate thermal contact with the compressed feed gas wherein the partially condensed depressurized vapor fraction is fully vaporized and the feed gases are cooled. The fully vaporized fraction and the liquid product fraction are recovered in separate streams.

6 Claims, 3 Drawing Figures

CRYOGENIC RECOVERY OF LIQUIDS FROM REFINERY OFF-GASES

CROSS-REFERENCE TO RELATED APPLICATION

This is a division of application Ser. No. 026,809, filed Apr. 4, 1979, now U.S. Pat. No. 4,272,270 issued June 9, 1981.

BACKGROUND OF THE INVENTION

A. Technical Field

This invention relates to the separation of petroleum refinery off-gases. More particularly, it relates to the separation of a light vapor fraction containing hydrogen and one or more $C_1$ to $C_4$ hydrocarbons from hydrogen-rich refinery off-gases to give a liquid product fraction.

B. Prior Art

The refining of petroleum, e.g., catalytic reforming of petroleum, is often accompanied by the evolution of significant volumes of off-gases composed predominantly of hydrogen together with substantial quantities of $C_1$ to $C_4$ hydrocarbons (i.e., methane, ethane, propanes and butanes) and gasoline. Ordinarily, such off-gases are routed to the refinery fuel gas system or simply disposed of by flaring. However, the difference between the value of off-gas components as separated and recovered liquid and their value as refinery fuel is often increased by market conditions to the point where there is economic justification for seeking their separation and recovery. For example, under current market conditions, such a difference can amount to a pretax profit of about 25 cents per gallon of $C_4$ and heavier components recovered in the form of gasoline, plus 6 cents per gallon recovered to LPG (liquefied petroleum gas) sales.

Although numerous techniques have been developed for separating gaseous mixtures into their constituents as disclosed, for example in U.S. Pat. No. 2,940,270 issued June 14, 1960 to D. F. Palazzo et al. for GAS SEPARATION;

U.S. Pat. No. 3,026,682 issued Mar. 27, 1962 to D. F. Palazzo et al. for SEPARATION OF HYDROGEN AND METHANE;

U.S. Pat. No. 3,119,677 issued Jan. 28, 1964 to J. J. Moon et al. for SEPARATION OF GASES;

U.S. Pat. No. 3,255,595 issued June 14, 1966 to S. G. Greco et al. for PURIFICATION OF HYDROGEN RICH GAS;

U.S. Pat. No. 3,292,380 issued Dec. 20, 1966 to R. W. Bucklin for METHOD AND EQUIPMENT FOR TREATING HYDROCARBON GASES FOR PRESSURE REDUCTION AND CONDENSATE RECOVERY;

U.S. Pat. No. 3,397,138 issued Aug. 13, 1968 to K. H. Bacon for GAS SEPARATION EMPLOYING WORK EXPANSION OF FEED AND FRACTIONATOR OVERHEAD;

U.S. Pat. No. 3,516,261 issued June 23, 1970 to M. L. Hoffman for GAS MIXTURE SEPARATION BY DISTILLATION WITH FEED-COLUMN HEAT EXCHANGE AND INTERMEDIATE PLURAL STAGE WORK EXPANSION OF THE FEED;

U.S. Pat. No. 3,729,944 issued May 1, 1973 to C. S. Kelley et al. for SEPARATION OF GASES;

U.S. Pat. No. 3,996,030 issued Dec. 7, 1976 to E.G. Scheibel for FRACTIONATION OF GASES AT LOW PRESSURE; and U.S. Pat. No. 4,040,806 issued Aug. 9, 1977 to K. B. Kennedy for PROCESS FOR PURIFYING HYDROCARBON GAS STREAMS, a need still exists for a way of economically separating refinery off-gases into a liquid product fraction, and a light vapor fraction containing hydrogen and one or more $C_1$ to $C_4$ hydrocarbons beginning at the low end under the aforementioned circumstances.

Accordingly, it is an object of the present invention to provide a means for separating petroleum refinery off-gases, e.g., catalytic reformer off-gas, into useful fractions or components.

Another object is to provide a method for separating petroleum refinery off-gases, e.g., catalytic reformer off-gas, into a liquid product fraction and a fraction containing hydrogen and one or more $C_1$ to $C_4$ hydrocarbons.

These and other objects of the invention as well as a fuller understanding of the advantages thereof can be had by reference to the following description, drawings and claims.

DISCLOSURE OF INVENTION

The foregoing objects are achieved according to the present invention by the discovery of a cryogenic liquid recovery process for treating hydrogen-rich refinery off gases such as catalytic reformer off-gas, in which free pressure drop is available in the gas stream to be processed. Some other refinery processes which can also supply feed gas suitable for this process include hydrotreaters and hydrodesulfurization units processing naphtha boiling between about 100° and about 450° F., middle distillates boiling between about 350° and about 750° F., heavier distillates boiling between about 650° and about 1100° F., and residual fuel oil. Accordingly, while the invention is described below primarily in the context of catalytic reformer off-gas feed, it is understood that hydrogen-rich refinery off-gases generally, including those mentioned above, are suitable for use in the present invention as long as there is free pressure drop available in the gas stream to be processed.

In one aspect of the invention, the process comprises feeding a hydrogen-rich reformer off-gas to a compressor/expander unit having compressor means and expander means mounted on and driven, either reciprocatingly or, preferably, rotary-wise (centrifugally), by a common shaft; the reformer off-gas is desirably fed at a temperature below about 120° F., desirably between about 90° and about 120° F., and pressure above aboutat between about 95° and about 105° F. and between about 150 and 200 psig. The reformer off-gas feed is pressurized in the compressor end of the compressor/expander unit, with the compressor discharge pressure being a direct function of the power supplied by the expander on the opposite end of the common shaft. Desirably, the off-gas feed is pressurized to a pressure of between about 180 and about 300 psig, preferably between about 185 and about 275 psig. The compressed gas is then transported to and cooled in a heat exchanger wherein the gas is partially condensed to form a two-phase fluid, a step which is desirably carried out so that the gas is cooled to a temperature low enough to achieve the desired amount of condensation, desirably between about −130° and about −100° F., and preferably to between about −125° and about −115° F. The two-phase fluid obtained from the heat exchanger is transmitted to a separator when in the liquid product phase is removed from the vapor phase, the latter containing hydrogen and at least one hydrocarbon selected from the group consisting of $C_1$ to $C_4$ hydrocarbons, desirably at least one $C_1$ to $C_3$ hydrocarbon, and preferably at least one $C_1$ or $C_2$ hydrocarbon. The vapor phase is transmitted from the separator to the turboexpander end of the compressor/expander, in the case of a rotary unit, wherein the vapor is depressurized and cooled across the turbine blades of the turboexpander and partially condensed thereby, the enthalpy removed from the vapor by the expander supplying power to drive the compressor end of the compressor/expander unit. Desirably, the vapor is depressurized and cooled in the turboexpander to between about 20 and about 100 psig and between about $-250°$ and about $-140°$ F., preferably between about 55 and about 65 psig and between about $-180°$ and about $-170°$ F. These conditions typically correspond to the pressure required for the expanded vapor to ultimately be discharged into the refinery fuel gas distribution system or the flows. The liquid phase product obtained in the separator and the partially condensed and depressurized vapor fraction from the turboexpander are transmitted to the heat exchanger wherein they are brought into thermal contact with (but kept physically separate from) the compressed feed gas from the compressor end of the compressor/expander unit, wherein the partially condensed and depressurized vapor fraction is fully vaporized and the compressed feed gas is cooled, after which the fully vaporized fraction and the liquid product fraction are withdrawn from the heat exchanger. Desirably, the liquid phase product fraction from the separator and the depressurized partial condensate from the turboexpander are heated by the feed gas within the heat exchanger to a temperature of about 5° F. or more below the temperature of the feed gas entering the exchanger, desirably between about 100° and about 140° F., and preferably to between about 130° and about 140° F. The partially condensed and depressurized vapor fraction from the turboexpander and the liquid product fraction from the separator are preferably fed into and withdrawn from the heat exchanger in separate streams.

Although the aforementioned embodiment utilizes a single compressor/expander unit, two or more such units, preferably connected in series, can be installed depending on the overall free pressure drop available and/or the desired degree of liquid product recovery. In such cases, the feed gas flow to the compressor ends is directly connected from one machine or unit to the next. However, the cold vapor to be expanded across the expander ends of the units should be free of significant amounts of entrained liquid droplets at the inlet of each expander. Therefore, a separator vessel is advantageously installed ahead of each expander. The liquid recovered in each such separator vessel can then be rejoined with each expander outlet stream via level control valves.

In another aspect of the invention, the two-phase fluid obtained by passing the compressed feed gas through the heat-exhanger is transmitted to the separator portion of a stabilizer comprising said separator and an externally heated, staged (e.g., packed or trayed) fractionation column situated beneath and in communication with the separator, wherein the liquid product phase is recovered from the vapor phase by gravity separation, some constituents of said vapor phase being fractionated from the net liquid product leaving the bottom of the tower, said vapor phase containing hydrogen and at least one hydrocarbon selected from the group consisting of $C_1$ to $C_4$ hydrocarbons, desirably at least one $C_1$ to $C_3$ hydrocarbon, and preferably a $C_1$ or $C_2$ hydrocarbon. The liquid product phase discharged from the bottom of the fractionation column of the stabilizer is circulated through a coil within the column whereby heat removed from the liquid product within the column furnishes supplemental side reboil heat for the stabilizer. Alternatively, in lieu of routing the net liquid product through a coil within the column, a conventional external side reboil heat exchanger can be utilized for this purpose, the details of the installation of which will be apparent to those skilled in the art. The vapor phase separated in the stabilizer is transmitted to the expander(s) of the compressor/expander unit(s) wherein the vapor is depressurized and cooled across the turbine blades of the turboexpander(s) (in the case of a rotary unit) and partially condensed thereby, the enthalpy removed from the vapor by the expander supplying power to drive the compressor(s). The partially condensed depressurized vapor fraction from the turboexpander is transmitted to the heat exchanger for thermal contact with the pressurized feed gas from the compressor, wherein the partially condensed depressurized vapor fraction is fully vaporized. Finally, the fully vaporized fraction is withdrawn from the heat exchanger and the liquid product phase is withdrawn and recovered from the column.

The two preceding aspects of the invention are particularly applicable where initial capital investment must be minimized and/or where high recovery of the lighter $C_1$ to $C_4$ hydrocarbon constituents are not major requirements. In the event that economics or overall refinery process requirements call for the highest practicable recovery of the lighter $C_1$ to $C_4$ hydrocarbons, preferably the $C_2$ and heavier hydrocarbons or the $C_3$ and heavier hydrocarbons, a further aspect of the invention can be utilized to achieve such higher recovery levels. In particular, as with the two previously described aspects of the invention, the feed gas is first pressurized by the compressor ends of one or more turboexpander/compressor units connected in series as described above. The resultant compressed feed gas is then cooled to below about 120° F. in a conventional heat exchanger against cooling water or by an air-cooled exchanger. Alternatively, any part of the cooling required by the compressed gas can be achieved by utilizing the heat available in this stream to supply part or all of the side and/or bottom reboil heat required by the stabilizer fractionation column. The cooled feed gas is then further cooled and partially condensed to form a two-phase fluid in one or more heat exchangers arranged so as to achieve the required amount of condensation. Some of the required cooling, if necessary, can be supplied by one or more supplemental external mechanical refrigeration units, the implementation of such units being readily apparent to those skilled in the art. The two-phase feed stream exiting the last exchanger would then flow to a separator vessel for removal of the liquid phase. The liquid phase thereby removed can then directly, or indirectly through one of the feed gas heat exchangers, be introduced into an intermediate stage of the stabilizer column. The vapor fraction leaving the high pressure feed gas separator can then proceed directly to the inlet of the first turboexpander or be further cooled and partially condensed in one or more heat exchangers, again followed by another separator vessel, the vapor from the separator flowing to the first turbo-expander inlet and the liquid being charged into an upper stage of the stabilizer column. In the event of a need for more than one turboexpander, the outlet two-phase stream leaving all but the last turboexpander in series can be separated into liquid and vapor fractions by separator vessels between each expander, to insure that no entrained liquid remains in the inlet vapor stream to each machine. Separated liquid fractions can be directly or indirectly introduced at the proper point to the stabilizer column. The two-phase stream exiting the last expander in the series can be discharged into a separator situated on top of, and in direct communication with, the fractionation section of the stabilizer column, as previously described. The total vapor stream leaving the separator atop the stabilizer, which comprises the last expander outlet plus the undesired hydrogen and lighter $C_1$ to $C_4$ hydrocarbons contained in the column feed liquid streams, can then be warmed by heat exchange with incoming feed gas as discussed previously. The operating pressure for the stabilizer column, as a minimum, can be adjusted to permit the lean residue gas product to proceed to its final destination, for example, the refinery fuel gas distribution system. Alternatively, the residue gas product can proceed to outside gas compression facilities should a need exist for the hydrogen component, e.g., in another refinery process. In the event that pressurization of the lean residue gas product is desired, the compressor ends of the expander/compressor units can be utilized for compression of the warmed residue gas product in lieu of feed gas compression as previously described. Also, in a further application of this process, the power produced by the expanders can be used to drive electric generators, air blowers, dynamometers, or other load devices on a common shaft with the expanders.

In a preferred mode of carrying out the aforementioned aspects of this invention, the feed gas to the process unit may require one or more types of pretreatment processing. For example, the cryogenic temperatures encountered within the basic process may cause some undesirable impurities contained in the feed gas to freeze or form hydrates. Examples of such impurities are water vapor and carbon dioxide, both of which, depending on the process conditions and their concentrations, could freeze within the unit. Thus, if the water content is high enough to warrant its complete removal, a separate dehydration unit can be installed to process the feed gas prior to its introduction into the facilities described herein. Carbon dioxide can be removed by any of several means conventionally utilized for this purpose, such as molecular sieves, amine solution, caustic soda solution, and the like. Where low concentrations of impurities are present in the feed gas, a freezing point depressant can be advantageously added to the feed gas prior to its being chilled, in an amount sufficient or as needed to prevent ice formation. Suitable freezing point depressants include any liquid known to be useful as a feed gas anti-freeze such as a $C_1$ to $C_3$ alcohol, e.g., methanol, ethanol, propanols, or mixtures thereof, these being especially preferred, in view of the fact that the freezing point depressant will substantially remain in the liquid product, and should therefore be compatible with it and its uses.

BRIEF DESCRIPTION OF THE DRAWINGS

The specific details of the invention and of the best mode known to me for carrying it out can be had by reference to the following description in conjunction with the accompanying drawings wherein.

DESCRIPTION OF PREFERRED EMBODIMENTS

Figure 1:
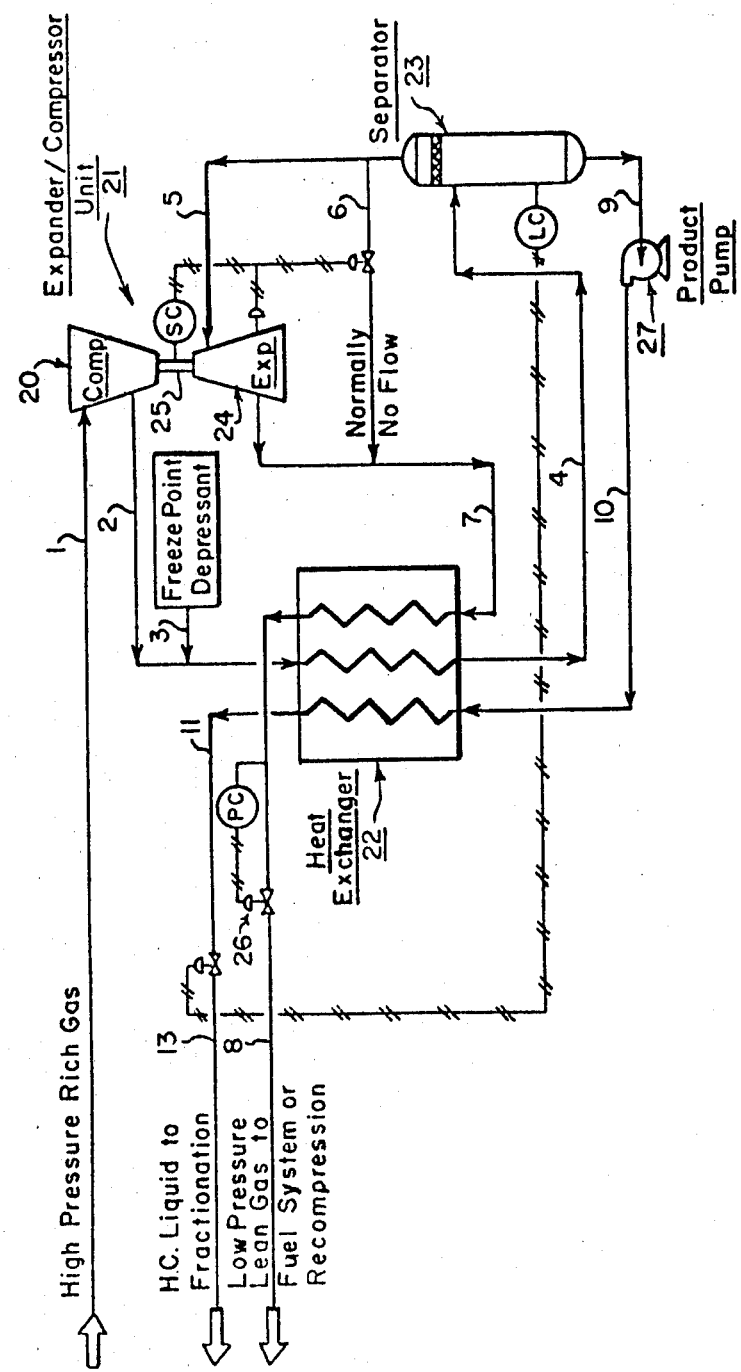
FIG. 1 is a schematic flow diagram representing a preferred embodiment of the process and apparatus of the invention.

Referring to FIG. 1, which describes the basic process configuration of the invention wherein the liquid product fraction of an off-gas feed is recovered in a form suitable for transfer to existing refinery fractionation facilities for stabilization and product separation, the process flow scheme shown can be applied to a modern catalytic reforming unit which operates at relatively low pressures. Although labeled on the flow diagram as "high pressure rich gas", the flow conditions of reformer off-gas feed stream 1 are usually below about 120° F. and above about 100 psig, desirably between about 90° and about 120° F. at between about 140 and about 250 psig, and preferably between about 95° and about 105° F. at between about 150 and about 200 psig, e.g., 100° F. at 155 psig. The feed gas 1 is first compressed by the centrifugal compressor end 20 of compressor/expander unit 21 to a pressure which is dependent on the power available from the expander, desirably between about 180 and 300 psig, and preferably between about 185 and 275 psig, e.g., about 190 psig. The pressurized feed gas stream 2 from compressor 20 is then cooled in heat exchanger 22 to a temperature corresponding to the amount of internal or external refrigeration available, desirably between about −130° and about −100° F., preferably between about −125° and about −115° F., e.g., −120° F., and partially condensed. The cold, two-phase stream 4 from heat exchanger 22 proceeds to separator 23 wherein a liquid product phase is recovered from the vapor phase, the latter containing hydrogen and at least one hydrocarbon selected from the group consisting of $C_1$ to $C_4$ hydrocarbons. The vapor phase stream 5 from separator 23 is transmitted to the turboexpander end 24 of expander/compressor unit 21 wherein the vapor is depressurized across the turbine blades (not shown) and partially condensed thereby. The work (enthalpy) removed from the cold vapor stream 5 by the turboexpander end 24 supplies the power needed to drive the compressor end 20 mounted on the common shaft 25.

Due to the work removal from the high-pressure cold vapor within turboexpander 24, the partially condensed exit stream 7 from the turboexpander is at a temperature of between about −250° and about −100° F. and pressure of between about 20 and about 100 psig, preferably between about −180° and about −170° F. at between about 55 and about 65 psig, e.g., −175° F. and 60 psig. The partially condensed steam 7 from turboexpander 24 proceeds back through heat exchanger 22 where it is fully vaporized and heated by the incoming feed gas stream 2 to a temperature of about 5° to 10° F. below the temperature of the feed gas entering the exchanger, desirably between about 100° and about 140° F., and preferably between about 130° and about 140° F., e.g. 135° F. The thus-vaporized and warm lean gas stream 8 from heat exchanger 22 then passes through pressure control station 26 which controls the expander outlet pressure. The low pressure lean gas thus obtained is then routed to the refinery fuel system, the flare or a hydrogen recompressor.

The cold liquid hydrocarbon fraction recovered from separator 23 as stream 9 is transmitted to product pump 27 at the operating temperature of the separator, desirably between about −130° and about −100° F., and preferably between about −125° and about −115° F., e.g., −120° F. The high pressure liquid stream 10 discharged from pump 27 proceeds to heat exchanger 22 wherein it is heated by compressed feed gas stream 2 to a temperature of between about 100° and about 140° F., and preferably between about 130° and about 140° F., e.g. 135° F., before being exported as stream 13 to fractionating facilities (not shown).

Since reformer off-gas normally contains some water vapor (typically 15–30 ppm), a freeze point depressant or antifreeze stream 3 can, if desired, be injected into the compressed feed gas stream 2 to prevent ice and/or hydrate formation. Suitable freeze point depressants include $C_1$ to $C_3$ alcohols, e.g., methanol, ethanol, or propanol which will remain in the recovered liquid product phase.

In carrying out the process depicted in FIG. 1, the expander/compressor unit is operated basically on speed control. Thus, when the flow of cold vapor stream 5 from separator 23 is equal to or below the designed throughput, all of such flow is processed through the expander. Should higher flows in stream 5 occur which, if not checked, could cause an overspeed situation for the expander, the excess flow is automatically by-passed around expander/compressor unit 21 through stream 6. Alternate controlling parameters, well-known to those skilled in the art, can easily be adapted to the expander unit, depending on the particular circumstances.

Typical unit feed gas and product compositions are shown in Table I.

Figure 2:
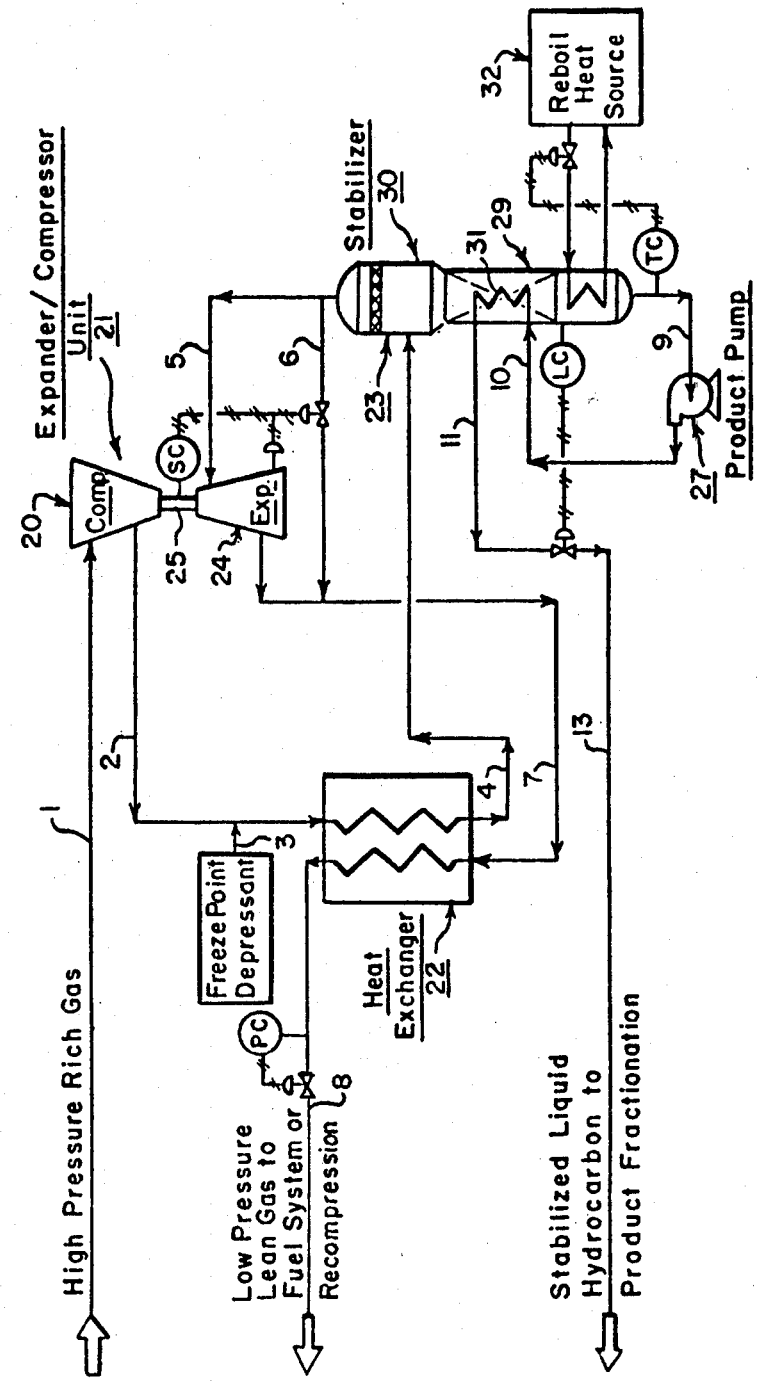
FIG. 2 is a schematic flow diagram representing another preferred embodiment of the invention.

Referring now to FIG. 2, which depicts a variant of the present process, the reference numerals identical to those in FIG. 1 refer to corresponding elements. In this embodiment, the separator 23 is situated on top of and in communication with a packed fractionation section 29, the entire unit 30 being referred to as a "stabilizer".

Liquid separated from the cold, two-phase stream 4 exiting heat exchanger 22 flows downward through the packing in the fractionating column or tower 29 of stabilizer 30. Lighter components are vaporized from the net liquid product leaving the bottom of fractionation tower 29. Depending on the lightest component desired in the net liquid product phase, stabilizer 30 operates as a de-methanizer (for ethane recovery to bottoms), as a de-ethanizer (for propane recovery), or a depropanizer (for butane recovery). In the configuration shown in FIG. 2, the stabilizer 30 is operating as a deethanizer such that all of the ethane and lower boiling constituents are fractionated from the net propane and heavier bottom product.

The recovered liquid product phase stream 10 discharged from product pump 27 is routed to and circulated through coil 31 wound through the packing in fractionation column 29. Heat removed from the liquid product in coil 31 furnishes supplemental side reboil heat for stabilizer 30. The main reboil heat to fractionation tower 29 is supplied from an outside source 32, such as a hot refinery process stream, low or high pressure steam, electric heater, and the like.

Typical unit feed gas and product compositions are shown in Table I.

TABLE 1

TYPICAL FEED AND PRODUCT COMPOSITIONS

| Component | Feed Gas* | | FIG. 1 BASIC PROCESS CONFIGURATION | | | FIG. 2 DEETHANIZING PROCESS CONFIGURATION | | |
|---|---|---|---|---|---|---|---|---|
| | | | Residue Gas | Liquid Product | | Residue Gas | Liquid Product | |
| | Moles/Hr. | Gal./Day | Moles/Hr. | Moles/Hr. | Gal./Day | Moles/Hr. | Moles/Hr. | Gal./Day |
| $H_2$ | 1,833.0 | — | 1,832.00 | 0.39 | — | 1,833.00 | 0.00 | — |
| $C_1$ | 40.9 | — | 40.56 | 0.34 | — | 40.90 | 0.00 | — |
| $C_2$ | 22.3 | 5,416 | 17.29 | 5.01 | 1,217 | 22.00 | 0.30 | 73 |
| $C_3$ | 16.4 | 4,101 | 3.85 | 12.55 | 3,139 | 4.18 | 12.22 | 3,056 |
| $iC_4$ | 4.2 | 1.248 | 0.24 | 3.96 | 1,177 | 0.27 | 3.93 | 1,168 |
| $nC_4$ | 5.3 | 1,517 | 0.16 | 5.14 | 1,472 | 0.19 | 5.11 | 1,463 |
| $iC_5$ | 2.8 | 931 | 0.02 | 2.78 | 924 | 0.03 | 2.77 | 921 |
| $nC_5$ | 1.5 | 494 | 0.01 | 1.49 | 490 | 0.01 | 1.49 | 490 |
| $C_6+$ | 22.0 | 7,579 | 0.00 | 22.00 | 7,579 | 0.00 | 22.00 | 7,579 |
| Total | 1,948.4 | 21,286 | 1,894.74 | 53.66 | 15,998 | 1,900.58 | 47.82 | 14,750 |
| MSCF/D | 17,746 | — | 17,257 | — | — | 17,310 | — | — |
| B/SD | — | 507 | — | — | 381 | — | — | 351 |

*Typically flow and analysis of catalytic reformer off-gas from a modern "low-pressure" unit with a capacity of 11,000 B/SD operating at a reformate octane level of 98.0 (unleaded)

Figure 3:
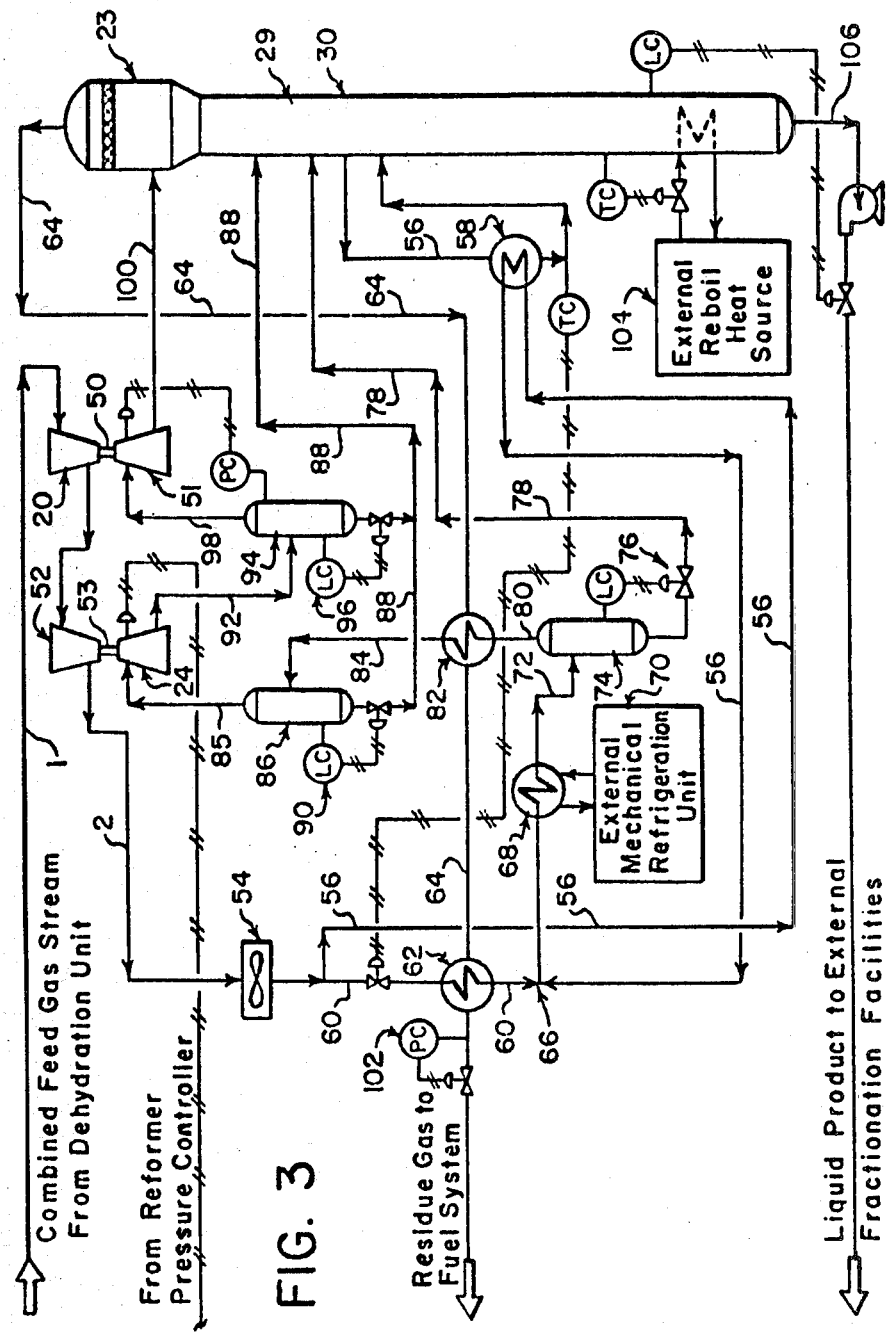
FIG. 3 is a schematic flow diagram representing a third preferred embodiment of the invention.

Referring now to FIG. 3, an alternate embodiment for higher recovery is depicted, in which reference numerals identical to those in FIGS. 1 and 2 refer to corresponding elements. In this embodiment, the feed gas 1 can comprise off-gas from a modern low pressure catalytic reforming unit, reformate stabilizer distillate vapor, and the off-gas from a hydrodesulfurization unit upstream from the reformer. Again, as indicated previously, the operating conditions indicated are typical of those encountered in a modern low pressure catalytic reforming unit, but the process is, in fact, adaptable to older catalytic reforming units, operated at 300 psig to 550 psig, or any hydrogen-rich refinery or petrochemical off-gas stream where free pressure drops would produce higher thermodynamic efficiency, i.e., higher recovery and/or less required external refrigeration.

Combined feed gas 1 from a molecular sieve dehydration unit (not shown) at 100° F. and 185 psig proceeds initially to the first stage compressor 20, which is on the same shaft 50 as the second stage expander 51, wherein the feed gas is pressurized and heated to about 223 psig and 131° F. From there, the feed gas flows to the second stage compressor 52, which is on the same shaft 53 as the first stage expander 24, wherein the feed gas is further pressurized and heated to 265 psig and 167° F. Pressurized feed gas 2 leaving the second stage compressor 52 is then cooled to 115° F. by an air-cooled exchanger 54. Part of the cooled feed gas 56 is then routed to the stabilizer side reboiler 58 where it is further cooled to about 30° F. The remaining portion 60 of the feed gas, amounting to about 70% of the total, is cooled in heat exchanger 62 to about −10° F. by thermal contact with the cooler residue gas product 64. The total feed gas is then recombined at 66 and flows through a refrigerant chiller exchanger 68 which further cools the feed stream to about −40° F. The cooling achieved in this exchanger is obtained by an external conventional mechanical refrigeration unit 70. Upon leaving the chiller 68, the cold, partially condensed, two-phase feed stream 72 flows into a separator vessel 74 operating at about −40° F. and 245 psig. Liquid collected in separator 74 is removed through a level control valve 76 and introduced as stream 78 to stabilizer column 30. Vapor 80 from separator 74 is routed through another heat exchanger 82 where it is further cooled and partially condensed by the cooler residue gas product 64 before flowing as stream 84 into the first expander inlet separator 86, operating at about −119° F. and 240 psig. Liquid 88 removed by separator 86 then flows via level control 90 to an upper feed stage in fractionation column 29 of stabilizer 30. The vapor 85 from separator 86 flows to first expander 24. The inlet nozzle vanes (not shown) on this machine are actuated by a pressure controller (not shown) located remotely in an upstream unit. The cold, partially condensed stream 92 leaving the first stage expander 24 then flows into second expander inlet separator 94, operating at about −155° F. and 115 psig. Liquid recovered by separator 94 is removed by level controller 96 and joins liquid stream 88 flowing from first expander inlet separator 86 to stabilizer 30. Vapor 98 from second expander inlet separator 94 flows into second expander 51. The inlet nozzle vanes (not shown) on this machine are actuated to control the pressure in second expander inlet separator 94. Both expanders 24 and 51 are also equipped with bypass control valves (not shown), whose operation has been discussed previously. The cold, low pressure, two-phase second expander effluent stream 100, operating at about −188° F. and 55 psig flows into the separator section 23 situated above the fractionation section 29 of stabilizer column 30.

Second expander outlet vapor plus fractionated vapors rising from the top stage of stabilizer column 30 form the residue gas stream 64. This cold vapor stream 64, operating at about −162° F. and 55 psig, flows back through the previously discussed exchangers 82 and 62, which warm the stream to about 105° F. The residue gas stream 64 then flows through a pressure control station 102, and subsequently to the refinery fuel gas distribution system (not shown). The pressure control station 102 assures that the pressure within this unit is maintained at a constant value sufficient to permit residue stream gas 64 to flow freely into the fuel system.

Part of the reboil heat required for the stabilizer column 29, which in this case is operated as a de-ethanizer, is obtained from side reboiler 58, extracting heat from incoming feed gas stream 56. The remaining reboil heat for the bottom reboiler can be obtained from any outside heat source 104. The liquid product stream 106 leaving the bottom of stabilizer column 29 is pumped to external fractionation facilities (not shown), where it is separated into propane, butanes, and gasoline products.

Typical feed gas, residue gas, and liquid product compositions for this high recovery mode of operation are presented in Table 2.

Pressure levels maintained within the cryogenic recovery unit of the apparatus of the invention can vary widely from one application to another, depending on the feed gas supply pressure (100 psig to 2,500 psig) and the residue gas pressure requirement at its destination (5 psig to 1,500 psig).

TABLE 2

TYPICAL FEED AND PRODUCT COMPOSITIONS FOR FIG. 3

| COMPONENT | FEED GAS* Moles/Hr | FEED GAS* Gals/Day | RESIDUE GAS Moles/Hr | LIQUID PRODUCT Moles/Hr | LIQUID PRODUCT Gals/Day |
|---|---|---|---|---|---|
| $H_2$ | 927.18 | | 927.18 | 0.00 | |
| $C_1$ | 69.23 | | 69.23 | 0.00 | |
| $C_2$ | 41.13 | 9,990 | 40.41 | 0.72 | 175 |
| $H_2S$ | 0.06 | 7 | 0.02 | 0.04 | 5 |
| $C_3$ | 30.23 | 7,560 | 2.21 | 28.02 | 7,007 |
| $iC_4$ | 6.22 | 1,848 | 0.00 | 6.22 | 1,848 |
| $nC_4$ | 6.29 | 1,801 | 0.00 | 6.29 | 1,801 |
| $iC_5$ | 3.32 | 1,104 | 0.00 | 3.32 | 1,104 |
| $nC_5$ | 2.73 | 898 | 0.00 | 2.73 | 898 |
| $C_6^+$ | 9.05 | 3,258 | 0.00 | 9.05 | 3,258 |
| TOTAL | 1,095.44 | 26,466 | 1,039.05 | 56.39 | 16,096 |
| MSCF/DAY | 9,977 | | 9,464 | — | |
| B/SD | — | | — | 383 | |

*Typical flow and analysis of composite feed stream consisting of reformer off-gas, reformate stabilizer distillate vapor, and HDS unit off-gas, from a nominal 8,000 B/SD "low-pressure" unit, operating a reformate octane level of 98.0 (unleaded).

The foregoing embodiments are presented for the purpose of illustrating, without limitation, the process and apparatus of the present invention. It is understood, of course, that changes and variations therein can be made without departing from the scope of the invention which is defined in the claims.

INDUSTRIAL APPLICABILITY

The present invention provides a cryogenic liquid recovery process which has particular application to petroleum refinery off-gases where free pressure drop is available in the gas stream to be processed, for example, in catalytic reforming units or various types of hydrotreating units where significant volumes of off-gas would otherwise be routinely depressurized to the refinery fuel gas system or flared.

Although the refinery off-gas streams are composed predominately of hydrogen, they also contain significant quantities of ethane, propane, butanes, and gasoline; the economic justification for the process is derived from the difference in value of these products as recovered liquid over their refinery fuel value. Although local marketing conditions would determine the economics of recovery for ethane and propane, the recovery of butanes and heavier components is justified for most refineries.

I claim:

1. A process for cryogenic recovery of liquid from refinery off-gas, comprising:
   (a) feeding the off-gas to a compressor/expander having compressor means and expander means mounted and driven on a common shaft;
   (b) compressing the off-gas feed in the compressor of the compressor/expander;

(c) cooling the compressed gas obtained from step (b) in a heat exchanger wherein the gas is partially condensed to form a two-phase fluid;

(d) transmitting the two-phase fluid obtained in step (c) to the separator portion of a stabilizer comprising said separator and an externally heated staged fractionation column situated beneath and in communication with the separator, wherein the liquid product phase is recovered from the vapor phase by gravity separation, the constituents of said vapor phase being fractionated from the net liquid product leaving the bottom of the tower, said vapor phase containing hydrogen and at least one hydrocarbon selected from the group consisting of $C_1$ to $C_4$ hydrocarbons;

(e) circulating the liquid product phase discharged from the bottom of the fractionation column of the stabilizer through a coil within the column whereby heat removed from the liquid product within the column furnishes supplemental side reboil heat for the stabilizer.

(f) transmitting the vapor phase separated in step (d) to the expander of the compressor/expander wherein the vapor is depressurized and cooled and partially condensed thereby, the enthalpy removed from the vapor by the expander supplying power to drive the compressor;

(g) transmitting the partially condensed depressurized vapor fraction obtained in step (f) to the heat exchanger for thermal contact with the compressed feed gas obtained in step (b) wherein the partially condensed depressurized vapor fraction is fully vaporized;

(h) withdrawing the fully vaporized fraction from the heat exchanger; and (i) withdrawing the liquid product phase from the column.

2. A process according to claim 1 wherein:
the refinery off-gas is fed to the compressor/expander in step (a) at a temperature below about 120° F. and pressure above about 100 psig.

3. A process according to claim 2 wherein:
the off-gas feed is catalytic reformer off-gas;
the compressor/expander is of the rotary type comprising centrifugal compressor means and turboexpander means mounted and driven on a common shaft;
the reformer off-gas is fed to the compressor/expander in step (a) at a temperature of between about 90° and about 120° F. and a pressure of between about 140 and about 250 psig;
the reformer off-gas feed is compressed in step (b) to a pressure of between about 180 and about 300 psig;
the compressed reformer off-gas is cooled in step (c) to a temperature of between about −130° and about −100° F.;
the vapor phase recovered in step (d) contains at least one hydrocarbon selected from the group consisting of $C_1$ to $C_3$ hydrocarbons;
the vapor phase separated in step (d) is depressurized and cooled in the turboexpander in step (f) to a pressure of between about 20 and 100 psig and temperature of between about −250° and about −100° F.; and
the partially condensed depressurized vapor fraction is heated to a temperature of between about 100° and about 140° F. by the feed gas in the heat exchanger in step (g).

4. A process according to claim 3 wherein:
the compressor/expander comprises a plurality of compressor/expander units connected and operated in series;
the reformer off-gas is fed to the compressor/expander unit in step (a) at a temperature of between about 95° and about 105° F. and a pressure of between about 150 and about 200 psig;
the reformer off-gas feed is compressed in step (b) to a pressure of between about 185 and about 275 psig;
the compressed reformer off-gas is cooled in step (c) to a temperature of between about −125 and about −115° F.;
the vapor phase recovered in step (d) contains at least one hydrocarbon selected from the group consisting of $C_1$ and $C_2$ hydrocarbons;
the vapor phase recovered in step (d) is depressurized and cooled in the turboexpander in step (f) to a pressure of between about 55 and 65 psig and temperature of between about −180° and about −170° F.; and
the partially condensed depressurized vapor fraction is heated to a temperature of between about 100° and about 140° F. by the feed gas in the heat exchanger in step (g).

5. A process according to claim 1, 2, 3 or 4 wherein a water freezing point depressant selected from the group consisting of $C_1$ to $C_3$ alcohols is added to the reformer off-gas feed obtained in step (b) in an amount sufficient to prevent ice formation, said depressant remaining substantially in the liquid product fraction.

6. A process according to claim 1, 2, 3 or 4 wherein a portion of the vapor phase flow to the expander of the compressor/expander in step (e) is adapted to be bypassed to the heat exchanger to prevent overspeed in

* * * * *

UNITED STATES PATENT AND TRADEMARK OFFICE
CERTIFICATE OF CORRECTION

PATENT NO. : 4,356,014

DATED : October 26, 1982

INVENTOR(S) : ROBERT D. HIGGINS

It is certified that error appears in the above—identified patent and that said Letters Patent is hereby corrected as shown below:

Column 1, line 49, "U.S. Pat. No. 3,255,595" should read -- U.S. Pat. No. 3,255.596--.

Column 2, line 52, delete "at" and insert -- 100 psig, desirably between about 140 and about 250 psig, and preferably --.

Column 3, line 2, "when in" should read --wherein--.

Column 3, line 22, "flows" should read --flare--.

Column 10, Table 2, under the heading "Gals/Day", "9.990" should read --9,990--.

UNITED STATES PATENT AND TRADEMARK OFFICE
CERTIFICATE OF CORRECTION

PATENT NO. : 4,356,014

DATED : October 26, 1982

INVENTOR(S) : ROBERT D. HIGGINS

It is certified that error appears in the above—identified patent and that said Letters Patent is hereby corrected as shown below:

Column 10, Table 2, on footnote, "operating a" should read --operating at a--.

Column 12, line 52, after "overspeed in", add --the compressor/expander, or for the control of another selected process variable--.

Signed and Sealed this

Fifth Day of April 1983

[SEAL]

Attest:

GERALD J. MOSSINGHOFF

Attesting Officer   Commissioner of Patents and Trademarks